M. B. McMANUS.

Bull Wheel for Artesian Wells.

No. 9,559. Reissued Feb. 8, 1881.

Witnesses.
Ino K Smith
L. C. Fitler.

Inventor,
Michael B. McManus
by his attorneys
Bakewell & Kerr

N. PETERS, PHOTO-LITHOGRAPHER, WASHINGTON, D.C.

UNITED STATES PATENT OFFICE.

MICHAEL B. McMANUS, OF TITUSVILLE, PENNSYLVANIA.

BULL-WHEEL FOR ARTESIAN WELLS.

SPECIFICATION forming part of Reissued Letters Patent No. 9,559, dated February 8, 1881.

Original No. 155,740, dated October 6, 1874. Application for reissue filed January 6, 1881.

*To all whom it may concern:*

Be it known that I, MICHAEL B. McMANUS, of Titusville, in the county of Crawford and State of Pennsylvania, have invented a new and useful Improvement in Bull-Wheels for Artesian Wells; and I do hereby declare the following to be a full, clear, and exact description thereof.

The object of my invention is to construct a strong cheap bull-wheel, that can be easily stored, transported, erected, and taken down; and it consists, first, of a shaft having angular or flat-sided hubs, radiating arms which are secured upon the sides of the hubs, and sectional or bent wooden rims which are fastened to the arms; and, second, of the combination of the foregoing features with auxiliary arms arranged between the principal arms.

To enable others skilled in the art to make and use my invention, I will now explain it by reference to the accompanying drawings, in which—

Figure 1:
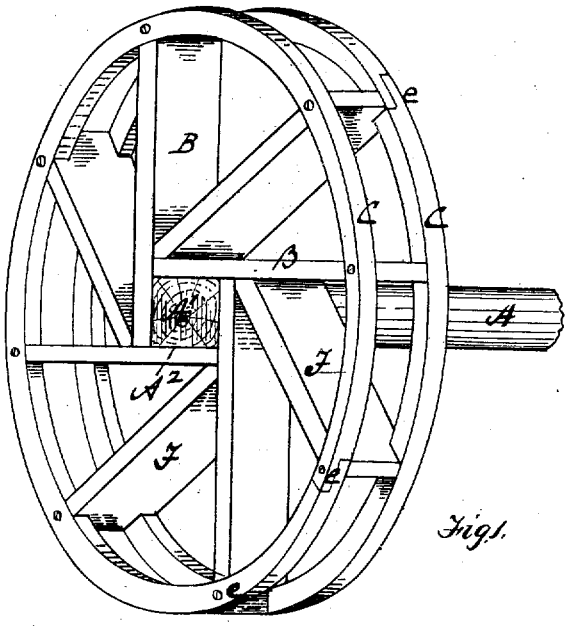
Figure 2:
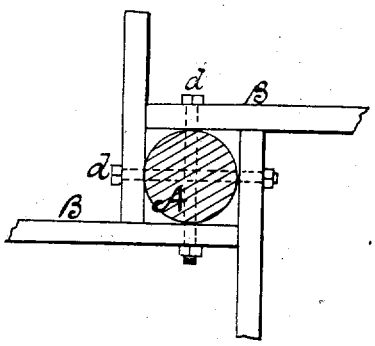
Figure 3:
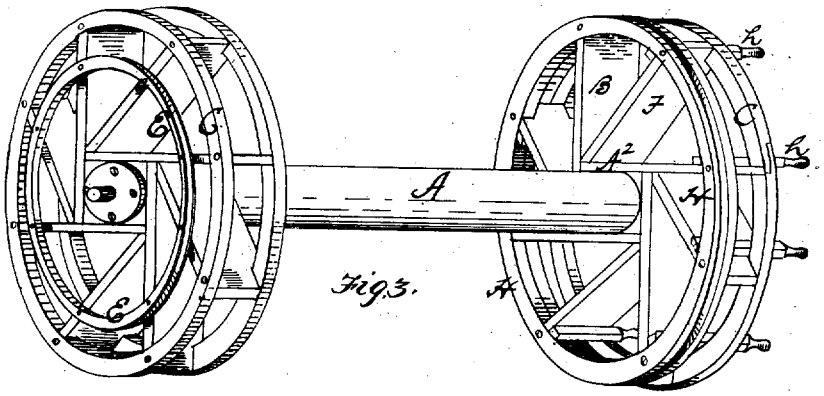

Figure 1 is a perspective view of one wheel, showing the shaft, arms, and rims. Fig. 2 is a section of the round shaft, showing the attachment of the main arms to the flat-sided hub; and Fig. 3 is a perspective view of the entire bull-wheel.

Like letters of reference indicate like parts in each.

The shaft A is cylindrical between the wheels, and is provided with a square or flat-sided hub, A′, at each end. The principal arms B are fastened to the sides $A^2$ of the hub A′ in such a manner that one side of each arm lies upon or against one of the sides of the hub and stands at an angle to the next preceding one. The arms B extend to the wooden rims C C, which are made in one piece, of hard wood steamed and bent, or in sections of convenient length. The ends of the rims C are scarfed or lapped and secured to the arms, as at *e*. The rims for the brake-wheel H and the rope-pulley wheel E, Fig. 3, are made and secured in the same manner.

Between the principal arms B are placed the auxiliary arms F, the inner ends of which are secured in the angles formed by the principal arms, and the outer ends are secured to the rims C. It is apparent that the auxiliary arms F serve as braces to strengthen the wheel. As shown, the arms B and F are notched to receive the rims C. The handles *h* are secured in the angles formed by the arms and rims, as shown in Fig. 3.

This construction makes a very strong, cheap, and easily-constructed wheel, as the hub is not mortised, and therefore is not weakened and does not require skilled labor to produce it.

The arms B are fastened to the hubs A′, Fig. 2, by bolts *d*, and the rims C to the arms by bolts or screws *e*.

By this construction the shaft, arms, rims, and handles can be easily transported, stored, put together, separated, and rebuilt whenever and wherever desired.

The wheel thus made is simple, cheap, and strong.

What I claim as my invention, and desire to secure by Letters Patent, is—

1. A bull-wheel for Artesian wells, consisting of a shaft with flat-sided hubs, radiating arms or spokes secured upon the sides of the hub, and wooden rims or fellies on the outer ends of the said arms, substantially as and for the purposes described.

2. A bull-wheel for Artesian wells, consisting of a shaft with flat-sided hubs, radiating arms secured upon the sides of the hub, wooden rims fastened to the arms, and auxiliary arms extending from the angle of the principal arms to the rims, substantially as and for the purposes described.

In witness whereof I have hereunto set my hand.

MICHAEL B. McMANUS.

Witnesses:
T. B. KERR,
R. H. WHITTLESEY.